(12) United States Patent
Vigholm et al.

(10) Patent No.: US 7,052,060 B2
(45) Date of Patent: May 30, 2006

(54) DEVICE AND METHOD FOR GRIPPING AT LEAST ONE ELONGATED ELEMENT

(75) Inventors: Bo Vigholm, Stora Sundby (SE); Gunnar Lindgren, Skogstorp (SE); Lennart Strandberg, Falun (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 10/904,095

(22) Filed: Oct. 22, 2004

(65) Prior Publication Data
US 2005/0140154 A1   Jun. 30, 2005

Related U.S. Application Data

(63) Continuation of application No. PCT/SE03/00370, filed on Mar. 4, 2003, now abandoned.

(30) Foreign Application Priority Data
Apr. 22, 2002  (SE) .................................. 0201198-9

(51) Int. Cl.
*B66C 1/28* (2006.01)
(52) U.S. Cl. ..................... 294/88; 294/106; 414/731; 414/739
(58) Field of Classification Search .............. 294/88, 294/86.4, 106; 414/555, 731, 739; 901/37
See application file for complete search history.

(56) References Cited

U.S. PATENT DOCUMENTS

| | | | | |
|---|---|---|---|---|
| 3,263,834 A | * | 8/1966 | La Tendresse | 414/550 |
| 3,371,952 A | | 3/1968 | Hunger | |
| 3,501,035 A | * | 3/1970 | Whiting | 414/731 |
| 3,631,995 A | * | 1/1972 | Jones et al. | 414/731 |
| 3,741,517 A | * | 6/1973 | Pogonwski | 251/5 |
| 3,782,567 A | * | 1/1974 | Likas et al. | 414/555 |
| 4,669,940 A | * | 6/1987 | Englehardt et al. | 414/303 |
| 5,201,838 A | * | 4/1993 | Roudaut | 294/88 |
| 5,516,174 A | | 5/1996 | Squyres | |
| 5,863,086 A | * | 1/1999 | Christenson | 294/106 |

* cited by examiner

Primary Examiner—Dean J. Kramer
(74) Attorney, Agent, or Firm—Novak Druce & Quigg, LLP

(57) ABSTRACT

Method and device for gripping one or more elongated element(s), which device includes two main gripping arms (1, 2) adapted to hold the element(s) between them. At least one first hydraulic cylinder (6, 7) is provided for moving the main gripping arms relative to one another. The device also has at least one auxiliary gripping arm (3, 4) and at least one second hydraulic cylinder (8, 9) for moving the auxiliary gripping arm relative to the main gripping arms in order to press the element(s) against the main gripping arms. The second hydraulic cylinder (8, 9) is connected operationally to the first hydraulic cylinder (6, 7) in such a way that the movement of the auxiliary gripping arm (3, 4) is initiated only when the piston of the first hydraulic cylinder reaches a predetermined position.

14 Claims, 3 Drawing Sheets

DEVICE AND METHOD FOR GRIPPING AT LEAST ONE ELONGATED ELEMENT

CROSS-REFERENCE TO RELATED APPLICATIONS

The present application is a continuation patent application of International Application No. PCT/SE03/00370 filed 4 Mar. 2003 now abandoned which was published in English pursuant to Article 21(2) of the Patent Cooperation Treaty, and which claims priority to Swedish Application No. 0201198-9 filed 22 Apr. 2002. Said applications are expressly incorporated herein by reference in their entireties.

FIELD OF THE INVENTION

The present invention relates to a device for gripping at least one elongated element such as a log or pole. The device comprises (includes, but is not necessarily limited to) two main gripping arms that are adapted to grasp and hold such an elongate element, or similar work-piece therebetween. A first (main) hydraulic cylinder is included for moving the main gripping arms relative to one another, but in a preferred embodiment, the device also includes at least one auxiliary gripping arm and a second (auxiliary) hydraulic cylinder for moving the auxiliary gripping arm relative to the main gripping arms for pressing a gripped elongate item against the main gripping arms. The invention is also described hereinbelow in a preferred utilization in which the device is incorporated upon a mobile machine, such as a wheel loader, for handling lumber. The invention also relates to an associated method executable with the device for gripping such elongate pieces.

The auxiliary gripping arm(s) is intended to be activated after the main gripping arms have been actuated to grip one or more elongate pieces, for example, a bundle of logs.

In the above-example, by bringing the auxiliary gripping arm against the bundle, the logs are packed together between the auxiliary gripping arm and the main gripping arms and the logs are thus held in a stable manner, thereby minimizing the risk that they falling out of the grip during transport. The auxiliary gripping arm is intended to be activated automatically when the main gripping arms have been moved together.

This type of gripping arm device is often used in an aggressive (rough) environment and is subjected to powerful impacts during operation. Broken-away pieces of wood, snow, ice and the like can find their way into the gripping arm system of the device which can have a negative effect on the control of the auxiliary gripping arm, and also subject associated hydraulic valves to great stresses. There are therefore problems in achieving a robust (dependable in such a rough environment as is typically encountered in logging operations), operationally reliable solution as far as the control of the auxiliary gripping arm is concerned.

BACKGROUND OF THE INVENTION

Patent specification SE 319 592 (U.S. Pat. No. 3,371,952) describes a log handling device of the type intimated above. The auxiliary gripping arm is operated hydraulically from the hydraulic circuit of the main gripping arms via a control valve or delay valve in such a way that the auxiliary gripping arm is moved after the main gripping arms have closed. The valve is arranged on a first hydraulic line which leads to the hydraulic cylinders which drive the main gripping arms and is activated only when a predetermined pressure has been reached in this line. When the main gripping arms close, the pressure in the first line builds up and, when it reaches the predetermined value, the valve opens and admits fluid into a second line which leads to a hydraulic cylinder for moving the auxiliary gripping arm.

One disadvantage of the log-handling device according to SE 319 592 (U.S. Pat. No. 3,371,952) is that, if a tree trunk comes to lie between the main gripping arms in such a way that they are not able to fully close, the pressure in the first line builds up all the same, and the auxiliary gripping arm will be moved. This can lead to one or more logs being dropped during transport, which would entail a risk of harm or damage for both personnel and equipment located along the movement path of the gripping arm.

SUMMARY OF THE INVENTION

One object of the invention is to provide a device which affords opportunities for more reliable operation in relation to other known solutions, and in particular, with regard to the activation of the auxiliary gripping arm(s).

This object is achieved by virtue of the fact that the second hydraulic cylinder is connected operationally to the first hydraulic cylinder in such a way that the movement of the auxiliary gripping arm is initiated only when the piston of the first hydraulic cylinder reaches a predetermined position. The position of the piston of the first hydraulic cylinder corresponds directly to the position of the main gripping arm and, by controlling the movement of the auxiliary gripping arm depending on the position of that piston, the auxiliary gripping arm will not be moved before the main gripping arm has reached its closed position.

According to one preferred embodiment of the invention, the first hydraulic cylinder is provided with an opening to which a first hydraulic line is connected, and the opening is arranged in such a position relative to the first hydraulic cylinder that the piston can pass thereby; therefore, the opening defines the predetermined piston position. In this way, a hydraulic signal can be obtained when the piston passes the predetermined position.

According to another preferred embodiment, the first hydraulic line is connected to a valve for control of the latter, which valve is in turn arranged on a second hydraulic line which is connected to the second hydraulic cylinder. When the piston passes the predetermined position, the pressure fluid from a pump will thus be made to act on the valve. The valve is preferably adapted to open at a pump pressure exceeding a specific value. According to one development (variation) of the invention, the device comprises a pump having variable displacement, and which is adapted to provide the first hydraulic cylinder with pressure fluid. When the piston has passed the opening and reaches its end position, the pressure which the pump delivers increases until the valve opens.

A further object of the invention is to provide a method which allows more reliable operation in relation to known systems, and in particular, with regard to the activation of the auxiliary gripping arm.

This object is achieved by virtue of the fact that, in a first step, two main gripping arms are moved relative to one another in such a way that they are made to grip at least one elongated element, and then, in a second step, at least one auxiliary gripping arm is moved relative to the main gripping arms in such a way that it presses the element against the main gripping arms. The movement of the auxiliary gripping arm is initiated by virtue of a piston in a first hydraulic cylinder that is adapted to move the main gripping arms relative to one another, reaching a predetermined position.

Further preferred embodiments and advantages of the invention emerge from the following description and the patent claims.

BRIEF DESCRIPTION OF FIGURES

The invention will be described in greater detail below with reference to the embodiment shown in the accompanying drawings, in which.

DETAILED DESCRIPTION OF PREFERRED EMBODIMENTS

Figure 1:
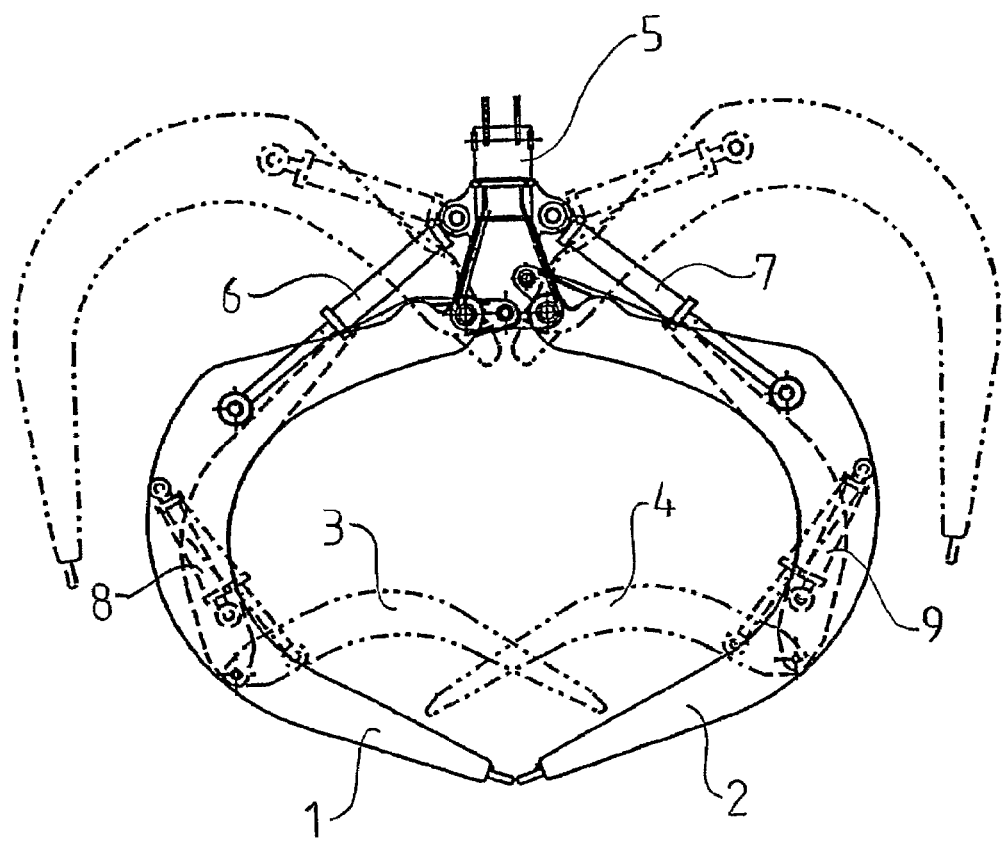
FIG. 1 is a diagrammatic illustration of the main and auxiliary gripping arms shown in a side view.

FIG. 1 shows a gripping arm device comprising two main gripping arms 1, 2 which are shown in an opened-out position (dot-dash lines) and a closed-together position (solid lines). In the closed-together position, the tips of the main gripping arms 1, 2 are in contact with one another or in direct proximity to one another. The gripping arm device also comprises two auxiliary gripping arms 3, 4 which are likewise shown in an opened-out position (dashed lines) and a closed-together position (dot-dash lines). The auxiliary gripping arms 3, 4 are arranged so as to move parallel to the plane in which the main gripping arms 1, 2 move.

The main gripping arms 1, 2 are pivotably connected to a center part 5. A first double-acting hydraulic cylinder 6, 7 arrangement (pair of opposed hydraulic cylinders 6, 7) is provided for moving each of the main gripping arms 1, 2. One end wall of each of the hydraulic cylinders 6, 7 is connected in an articulated manner to the center part 5, and each of the piston rods of the hydraulic cylinders 6, 7 is connected in an articulated manner to the main gripping arm 1, 2.

Each of the auxiliary gripping arms 3, 4 is arranged pivotably on one of the main gripping arms 1, 2. A second double-acting hydraulic cylinder 8, 9 is provided for moving each of the auxiliary gripping arms 3,4 relative to the respective main gripping arm 1,2.

One end wall of each of the hydraulic cylinders 8, 9 is connected in an articulated manner to the respective main gripping arm 1, 2, and each of the piston rods of the hydraulic cylinders 8,9 is connected in an articulated manner to said auxiliary gripping arm 3,4.

When a bundle of tree trunks is gripped, both the main gripping arms 1, 2 and the auxiliary gripping arms 3, 4 are initially arranged in the opened-out position.

Initially, the main gripping arms 1, 2 are moved together into the closed-together position. Then the auxiliary gripping arms 3, 4 are moved toward their closed-together position. In this manner the tree trunks, logs or other elongate work-pieces are packed in the space between the main gripping arms 1,2 and the auxiliary gripping arms 3,4.

Figure 2:
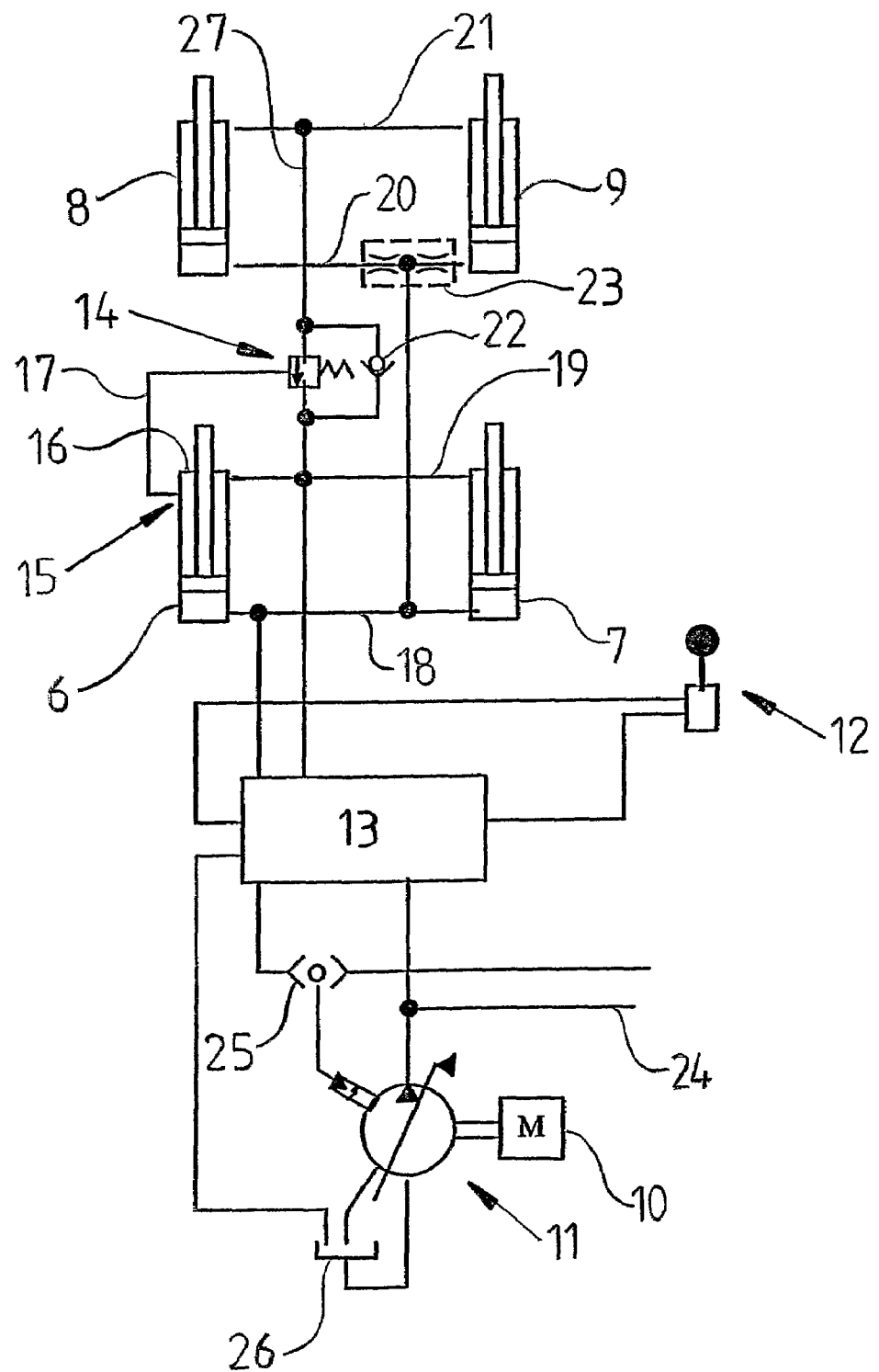
FIG. 2 is a schematic showing an exemplary device or arrangement for controlling the gripping arms of FIG. 1.
Figure 3:
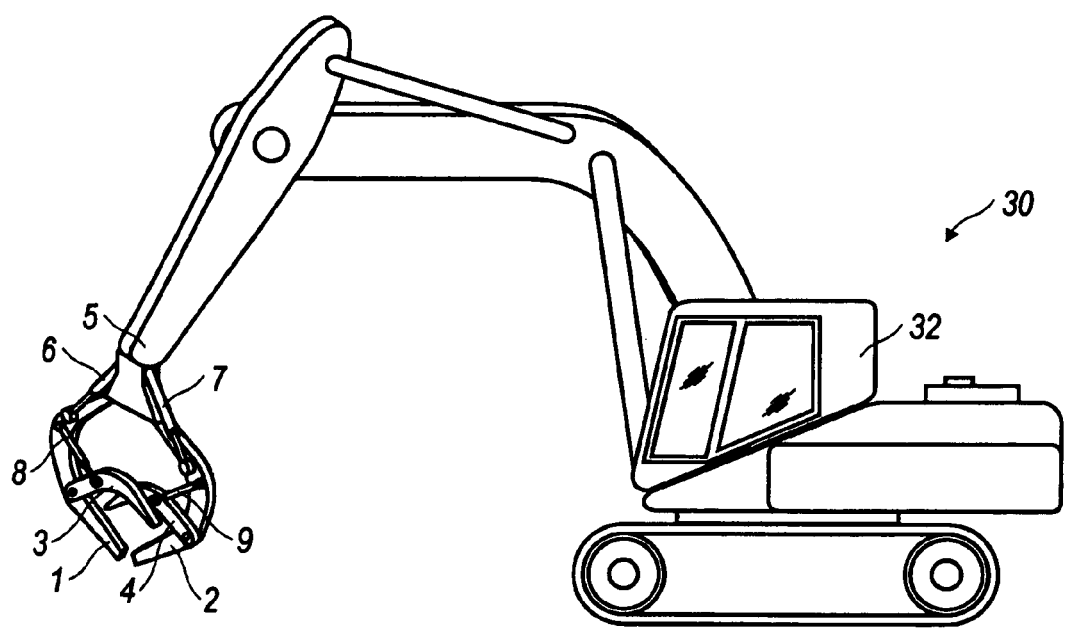
FIG. 3 is an illustration of a device according to the present invention connected to a vehicle.

FIGS. 2 and 3 show a hydraulic system for controlling the main gripping arms 1, 2 and the auxiliary gripping arms 3, 4. The system is of the load-sensing type, a variable pump 11 delivering the quantity of pressure fluid required, in the form of hydraulic oil. The system comprises a motor 10 for driving the pump 11. In this exemplary case, the motor 10 consists of the driving engine of vehicle 30. A directional valve 13 controlled by a lever actuator 12 is connected to the pump 11 and to the hydraulic cylinders 6–9 for operating these. The lever actuator 12 is arranged in the vehicle cab 32 for manual operation by the driver.

The first cylinders 6, 7 for moving the main gripping arms 1, 2 are arranged in a parallel configuration in such a way that they are activated essentially simultaneously. The second cylinders 8, 9 for moving the auxiliary gripping arms 3, 4 are also arranged in a parallel configuration in such a way that they are activated essentially simultaneously. The second hydraulic cylinders 8, 9 are also arranged in series after the first hydraulic cylinders 6, 7 in the flow direction from the pump 11.

When the actuator 12 is operated by the driver for gripping a bundle of logs, the directional valve 13 is adjusted so that the piston side of the two first cylinders 6, 7 is connected to the pump 11. At the same time, the piston side of the two second cylinders 8, 9 is connected to the pump 11. The piston rod side of the two first hydraulic cylinders 6, 7 is also connected to a sump 26 when the valve is operated. The piston rod side of the two second cylinders 8, 9 is, however, not connected to the sump 26 when the directional valve 13 is operated. The piston rod side of the two second cylinders 8, 9 is connected to a spring-loaded, pressure-controlled sequential valve 14 which remains closed when the directional valve 13 is operated. This arrangement results in the main gripping arms 8, 9 being moved while the auxiliary gripping arms 3,4 are not moved relative to the main gripping arms 1,2 when the directional valve 13 opens.

Each of the second hydraulic cylinders 8, 9 is connected operationally to one 6 of the first hydraulic cylinders in such a way that the movement of the auxiliary gripping arms is initiated only, when the piston of the first hydraulic cylinder 6 reaches a predetermined position. For this purpose, the first hydraulic cylinder 6 has an opening 15 through its wall in proximity to its end wall 16 on the piston rod side.

The opening 15 is also arranged in such a position in the first hydraulic cylinder 6 that the piston of the latter can pass it. The position of the opening 15 in the longitudinal direction of the hydraulic cylinder 6 defines said predetermined piston position. A first hydraulic line 17 also connects the opening 15 to the sequential valve 14 in such a way that the sequential valve is made to open when a predetermined pressure is reached in the line 17.

The position of the opening 15 in the longitudinal direction of the hydraulic cylinder 6 corresponds to the main gripping arms 1, 2 having reached their closed position (see FIG. 1). When the piston passes the opening 15, a flow connection is made between the line 17 and the pump 11. When the piston reaches its end position in the cylinder 6, the pump 11 goes up to maximum pressure. The sequential valve 14 is then loaded by the pressure from the pump 11 and, when a predetermined pressure has been reached, the valve 14 opens and a flow connection is made between the piston rod sides of the second hydraulic cylinders 8,9 and the sump 26 via a second hydraulic line 27. This results in the auxiliary gripping arms 3, 4 being moved from their opened-out position toward their closed-together position. If such a large bundle of trunks has been gripped by the main gripping arms 1, 2 that they do not reach their closed-together position; that is to say, their tips do not come into contact with one another, there is no need to compress the bundle by means of the auxiliary gripping arms 3, 4. In this case, the auxiliary gripping arms 3, 4 will not be moved either because the piston in the first cylinder 6 will not pass the opening 15.

A line 18 connects the piston side of the two first cylinders 6, 7. This piston side connecting line 18 is also connected to the directional valve 13. Another line 19 connects the piston rod side of the two first cylinders 6, 7. This piston rod side connecting line 19 is also connected to the directional valve 13 and also to the sequential valve 14. In a corresponding way, a line 20 connects the piston side of the two second cylinders 8, 9, and a line 21 connects the piston rod side of the two second cylinders 8, 9. The piston side connecting line 20 of the second cylinders 8, 9 is connected to the piston side connecting line 18 of the first cylinders 6,7. The piston rod side connecting line 21 of the second cylinders 8, 9 is connected to the piston rod side connecting line 19 of the first cylinders 6, 7 via said spring-loaded sequential valve 14.

A non-return valve 22 is arranged parallel to the sequential valve 14 for bringing about movement of the auxiliary gripping arms 3, 4 back into the opened-out position. For movement of the main gripping arms 1, 2 and the auxiliary gripping arms 3,4 back into the opened-out position, the directional valve 13 is moved into a position in which the pump 11 is connected to the piston rod side of the first cylinders 6,7 and the piston rod side of the second cylinders 8, 9 via the non-return valve 22. The piston sides of the first and second cylinders 6, 7 and, respectively, 8, 9 are at the same time connected to the sump 26 via the directional valve 13.

A flow divider 23 is arranged on the piston side connecting line 20 for conducting a flow of the same magnitude to the two piston side openings of the second cylinders 8, 9 when movement of the auxiliary gripping arms toward the closed-together position takes place.

Coupled to the line from the pump 11 to the directional valve 13 is a line 24 for any other hydraulic functions. It is therefore possible to use the same pump for several other functions as well, such as steering cylinders, lifting cylinders and/or tilting cylinders. Coupled to the line from the directional valve 13 to the pump 11 is furthermore a line running via a shuttle valve 25 for load signals from said any other hydraulic functions. The shuttle valve 25 ensures that the pump 11 delivers a pressure which is sufficient for the load which requires the highest pressure. The pump pressure is adjusted to a value which lies, for example, 20 bars above the highest load pressure required.

The first hydraulic cylinder 6 therefore has three openings, or ports, namely a first opening for entry/exit of fluid on the piston side, a second for exit/entry of fluid on the piston rod side and also said, third opening 15 in proximity to the end wall 16 on the piston rod side but at a sufficiently great distance from the end wall for the piston to be capable of passing the opening. The opening 15 also extends radially out through the wall of the cylinder.

According to a development of the embodiment illustrated, the piston of the first hydraulic cylinder 6 can be set in a number of positions relative to the piston rod in the longitudinal direction of the piston rod. This can be affected by, for example, the piston being shimmed relative to the piston rod. In this way, any tolerance difficulties arising with the position of the opening 15 in the cylinder can be remedied. In other words, it is in this way made possible to adapt/adjust the position in which the movement of the auxiliary gripping arms is initiated.

The invention is not to be considered as being limited to the illustrative embodiment described above, but a number of further variants and modifications are conceivable within the scope of the patent claims. For example, the hydraulic schematic of FIG. 2 should be regarded only as an example for implementation of the invention. Furthermore, the invention, in its most general form, is limited to the movement of the auxiliary gripping arm being initiated only when the piston of the first hydraulic cylinder reaches a predetermined position. This terminology also includes movement of the auxiliary gripping arm when the piston rod of the hydraulic cylinder reaches a given position because the piston and the piston rod are firmly interconnected.

According to an alternative to the embodiment illustrated in FIG. 2, where the pump 11 delivers the driving pressure for opening the sequential valve 14, the driving pressure can be generated by means of another component, such as a hydraulic cylinder.

Still further, the invention is not limited to what is known as a load-sensing system with a pump having variable displacement, but also can be implemented in a system with a pump of the fixed type. At a given lever displacement and above, a sufficiently high pressure is achieved in order to operate the valve 14.

According to a further alternative, one of the main gripping arms is arranged statically, and the other main gripping arm is movable relative thereto. According to this alternative, only one first hydraulic cylinder is therefore required.

According to another alternative, the device comprises only one auxiliary gripping arm which is then arranged pivotably toward a folded-out position in which it can bear from above against a bundle of logs gripped by the main gripping arms. According to this alternative, only one second hydraulic cylinder is therefore required.

According to a further alternative, the auxiliary gripping arm(s) is/are not pivotably arranged on the main gripping arms, but is/are instead connected to the center portion or member.

The term elongated element of course includes not only elements with an essentially circular cross-sectional shape, but also elements with other cross-sectional shapes, such as rectangular and the like. The present device can therefore also be used for applications other than log handling, such as handling boards, planks, sleepers, beams and so forth. The elongated elements can also be made of any material; that is to say, not only of wood, but also of plastic, concrete, steel, as well as others.

The gripping arm device can also be used in types of vehicle other than wheel loaders, for example, in excavator loaders and trucked cranes.

It should also be appreciated that the gripping arm device can also be arranged in a stationary machine, for example in a sawmill or steel plant.

What is claimed is:

1. A device for gripping at least one elongate element, said device comprising:
    two main gripping arms (1, 2) configured to hold an elongate element therebetween and at least one main hydraulic cylinder (6, 7) that moves the main gripping arms relative to one another;
    at least one auxiliary gripping arm (3, 4); and,
    at least one auxiliary hydraulic cylinder (8, 9) for moving the auxiliary gripping arm relative to the main gripping arms to press a gripped elongate element against the main gripping arms; and
    wherein said main hydraulic cylinder (6, 7) comprises an opening (15), to which a main hydraulic line (17) is connected, said opening being located in the main hydraulic cylinder so that a piston of the main hydraulic cylinder (6, 7) passes thereby, and the opening (15) defines a predetermined piston position and said auxiliary hydraulic cylinder is operationally connected to the main hydraulic cylinder (6,7) and is configured so that movement of the auxiliary gripping arm (3,4) is initiated only when the piston of the main hydraulic cylinder reaches the predeterminded position.

2. The device as recited in claim 1, wherein the main hydraulic line (17) is connected to a valve (14) for hydraulic control of said valve, said valve being arranged in a second hydraulic line (27) connected to said auxiliary hydraulic cylinder (8,9).

3. The device as recited in claim 2, wherein said second hydraulic line (27) forms a return line from said auxiliary hydraulic cylinder (8,9).

4. The device as recited in any one of claims 2 and 3, wherein said valve (14) is spring-loaded.

5. The device as recited in claim 4, wherein the valve (14) is adapted to open at a driving pressure exceeding a specific value.

6. The device as recited in claim 1, wherein the main hydraulic cylinder and the auxiliary hydraulic cylinder are connected via a hydraulic system.

7. The device as recited in any one of claims 1 and 6, wherein said device comprises a pump (11) with variable displacement.

8. The device as recited in any one of claims 1 and 6, wherein said device comprises two main hydraulic cylinders (6,7) which are each arranged for controlling respective main gripping arms (1,2).

9. The device as recited in any one of claims 1 and 6, wherein said device is incorporated onto a vehicle configured for lumber handling.

10. The device as recited in any one of claims 1 and 6, wherein said device comprises two auxiliary gripping arms (3, 4).

11. The device as recited in claim 10, wherein the device comprises two auxiliary hydraulic cylinders (8,9) which are each arranged for controlling one of the auxiliary gripping arms (3,4).

12. A method for gripping at least one elongated element, said method comprising:
moving two main gripping arms (1, 2) relative to one another and thereby gripping an elongate element;
moving at least one auxiliary gripping arm (3, 4) relative to the main gripping arms and thereby pressing said elongate element against the main gripping arms; and
initiating said movement of the auxiliary gripping arm (3, 4) when a piston in a main hydraulic cylinder (6, 7) that moves the main gripping arms (1, 2) reaches a predetermined position, said predetermined position defined by an opening in the main hydraulic cylinder to which a main hydraulic line connects, said piston Passing thereby.

13. The method as recited in claim 12, further comprising: establishing a flow connection between an opening (15) through a first hydraulic cylinder and a pump (11) when a piston of the main hydraulic cylinder (6, 7) passes said predetermined position, and said opening being connected to a first hydraulic line (17).

14. The method as recited in claim 13, further comprising: arranging a valve (14) on a second hydraulic line (27) which leads to a second hydraulic cylinder (8, 9), said valve (14) being adapted to move the auxiliary gripping arm (3, 4) relative to the main gripping arms (1, 2), and said valve (14) also being connected to the first hydraulic line (17) and being acted upon when said flow connection is achieved.

* * * * *